(12) United States Patent
Rantala et al.

(10) Patent No.: US 10,495,880 B2
(45) Date of Patent: Dec. 3, 2019

(54) CONTROLLING OF LIFTING DEVICE

(71) Applicant: Konecranes Global Oy, Hyvinkää (FI)

(72) Inventors: Kimmo Rantala, Hyvinkää (FI);
Johannes Tarkiainen, Hyvinkää (FI)

(73) Assignee: KONECRANES GLOBAL OY, Hyvinkaa (FI)

(*) Notice: Subject to any disclaimer, the term of this patent is extended or adjusted under 35 U.S.C. 154(b) by 4 days.

(21) Appl. No.: 15/753,715

(22) PCT Filed: Aug. 19, 2016

(86) PCT No.: PCT/FI2016/050570
§ 371 (c)(1),
(2) Date: Feb. 20, 2018

(87) PCT Pub. No.: WO2017/032922
PCT Pub. Date: Mar. 2, 2017

(65) Prior Publication Data
US 2018/0252921 A1    Sep. 6, 2018

(30) Foreign Application Priority Data

Aug. 21, 2015    (FI) ..................................... 20155599

(51) Int. Cl.
*G02B 27/01* (2006.01)
*B66C 13/44* (2006.01)
(Continued)

(52) U.S. Cl.
CPC .......... *G02B 27/0172* (2013.01); *B66C 13/40* (2013.01); *B66C 13/44* (2013.01);
(Continued)

(58) Field of Classification Search
CPC ......... B66C 13/40; B66C 13/44; B66C 13/46; B66C 17/00; G02B 2027/0138;
(Continued)

(56) References Cited

U.S. PATENT DOCUMENTS 4,546,443 A    10/1985  Oguchi et al.
6,474,922 B2 *  11/2002  Bachman .................. B66C 1/34
                                                              212/278
(Continued)

FOREIGN PATENT DOCUMENTS

CN    2138306 Y    7/1993
CN    102906623 A   1/2013
(Continued)

OTHER PUBLICATIONS

Search Report received for Chinese Patent Application No. 2016800479850, dated Dec. 25, 2018, 2 pages including partial English translation.

(Continued)

*Primary Examiner* — Tony O Davis
(74) *Attorney, Agent, or Firm* — Ziegler IP Law Group, LLC

(57) ABSTRACT

A method and equipment for detecting with smart glasses used by the operator an target intended by the operator; detecting a driving command given by the operator; and responsively to the detection of the driving command steering the loading member or the load towards said target.

14 Claims, 2 Drawing Sheets

(51) Int. Cl.
   *B66C 17/00* (2006.01)
   *G06F 3/0487* (2013.01)
   *G06F 3/01* (2006.01)
   *B66C 13/40* (2006.01)
   *B66C 13/46* (2006.01)

(52) U.S. Cl.
   CPC .............. *B66C 13/46* (2013.01); *B66C 17/00* (2013.01); *G02B 27/017* (2013.01); *G06F 3/012* (2013.01); *G06F 3/013* (2013.01); *G06F 3/0487* (2013.01); *G02B 27/01* (2013.01); *G02B 2027/014* (2013.01); *G02B 2027/0138* (2013.01); *G02B 2027/0178* (2013.01); *G02B 2027/0198* (2013.01)

(58) Field of Classification Search
   CPC ...... G02B 2027/014; G02B 2027/0178; G02B 2027/0198; G02B 27/01; G02B 27/017; G02B 27/0172; G06F 3/012; G06F 3/013; G06F 3/0487
   USPC ........................................................ 212/197
   See application file for complete search history.

(56) References Cited

U.S. PATENT DOCUMENTS

| | | | |
|---|---|---|---|
| 7,185,774 B2 * | 3/2007 | Colgate | B66C 17/00 212/270 |
| 2003/0043268 A1 | 3/2003 | Mann | |
| 2003/0076293 A1 | 4/2003 | Mattsson | |
| 2004/0101192 A1 | 5/2004 | Yokoyama | |
| 2005/0007553 A1 * | 1/2005 | Romanoff | B66F 11/048 352/243 |
| 2011/0066335 A1 * | 3/2011 | Hashimoto | B66C 13/40 701/50 |
| 2011/0121068 A1 | 5/2011 | Emanuel et al. | |
| 2012/0194553 A1 | 8/2012 | Osterhout et al. | |
| 2014/0118250 A1 | 5/2014 | Kim | |
| 2014/0184643 A1 | 7/2014 | Friend | |
| 2015/0168727 A1 | 6/2015 | Qaddoura | |
| 2015/0212576 A1 | 7/2015 | Ambrus et al. | |
| 2015/0227222 A1 * | 8/2015 | Sako | G06F 3/011 345/173 |
| 2015/0329333 A1 * | 11/2015 | Fenker | B66C 13/46 212/225 |
| 2016/0052755 A1 * | 2/2016 | Willim | B66C 23/62 212/299 |
| 2016/0379051 A1 * | 12/2016 | Lee | H04N 5/23222 348/78 |
| 2017/0283223 A1 * | 10/2017 | Shan | G01S 19/41 |
| 2017/0343308 A1 * | 11/2017 | Wojciechowski, III | B08B 9/023 |
| 2018/0141751 A1 * | 5/2018 | Muranaka | B25J 13/06 |
| 2018/0282131 A1 * | 10/2018 | Hayashi | B66C 13/40 |

FOREIGN PATENT DOCUMENTS

| | | |
|---|---|---|
| DE | 102009002677 A1 | 10/2010 |
| EP | 0913790 A1 | 5/1999 |
| JP | H06293495 A | 10/1994 |
| JP | H09194186 A | 7/1997 |
| JP | 2008143701 A | 6/2008 |
| WO | 2007/097738 A2 | 8/2007 |
| WO | 2007/097738 A3 | 4/2009 |

OTHER PUBLICATIONS

Extended European Search Report received for European Patent Application No. EP16838615.9, dated Mar. 1, 2019, 09 pages.
Finland Patent Office, Search Report, Application No. 20155599, dated Apr. 21, 2016, 2 pages.
Chen Y et al. "Attentional object spotting by integrating multimodal input." In: Proceedings of the Fourth IEEE International Conference on Multimodal Interfaces, Piscataway, NJ, USA; IEEE, Oct. 14, 2002, ISBN 978-0-7695-1834-3; ISBN 0-7695-1834-6, 6 pages.
Atienza & Zelinsky "Intuitive Interface through Active 3D Gaze Tracking." In: Proceedings of the 2005 International Conference on Active Media Technology, Retrieved from http://ieeexplore.ieee.org/document/1505258, 6 pages.
Atienza & Zelinsky "Active Gaze Tracking for Human-robot Interaction." In: Proceedings of the Fourth IEEE International Conference on Multimodal Interfaces, Piscataway, NJ USE: IEEE, Oct. 14, 2002, ISBN 978-07695-1834-3; ISBN 0-7695-1834-6, 6 pages.
Twardon L et al. "Exploiting eye-hand coordination: A novel approach to remote manipulation." In: Proceedings of the International Conference on Intelligent Robots and Systems. Nov. 10, 2013, ISSN 2153-0858, doi: 10.1109/IROS.2013.6697147, 6 pages.
Mitsugame I et al. "Robot Navication by eye pointing." In: Proceedings of the International Conference on Entertainment Computing (ICEC 2005), Sep. 19, 2005 to Sep. 21, 2005, 2005, doi: 10.1007/11558651_26, 12 pages.
Adiba A et al. "Intention-shared user-interface by the auto-discrimination of gaze object 'See what I see'". In: Proceedings of the 2014 International Symposium on Micro-NanoMechatronics and Human Science (MHS), Nov. 10, 2014, doi: 10.1109/MHS.2014.7006122, 3 pages.
Sakita K et al. "Flexible cooperation between human and robot by interpreting human intention from gaze information." In: Proceedings of the International Conference on Intelligent Robots and Systems, Sendai, Japan, Sep. 28, 2004-Oct. 2, 2004, IEEE/RSJ, 2004. ISBN 978-0-7803-8463-7; ISBN 0-7803-8463-6, doi: 10.1109/IROS.2004.1389458, 6 pages.
Suter J et al. "Evaluation and Integration of a wireless touchscreen into a bridge crane control system." In: Proceedings of the International Conference on Advanced Intelligent Mechatronics, Sep. 1, 2007, IEEE/ASME, 2007, ISBN 978-1-4244-1263-1; ISBN 1-4244-1263-3.
International Search Report and Written Opinion of the International Searching Authority, Application No. PCT/FI2016/050570, dated Nov. 25, 2016, 15 pages.
Brancati, Nadia, et al. "Touchless Target Selection Techniques for Wearable Augmented Reality Systems~." In:—Damiani E. et al. (eds) Intelligent Interactive Multimedia Systems and Services. Smart Innovation, Systems and-Technologies, vol. 40, Springer, First Online May 27, 2015, ISBN: 978-3-319-19830-9, https://doi.org/10.1007/, 9 pages.
Mayer, Simon et al. "User Interface-Beaming—Seamless Interaction with Smart Things Using Personal Wearable Computer." In: Wearable and Implantable Body Sensor Networks Workshops (BSN Workshops), 2014, 11th International Conference on Jun. 16-19, 2014, Zurich, Switzerland, ISBN: 978-1-4799-61368, DOI: 10.1109/BSN.Workships.2014.17.
Kirchbach, Kim et al. "Optimized Work Flow through VR and AR Technology on Construction Sites." In: Information Visualization (IV, 2011, IEEE ISBN 978-1-4577-0868-8; ISBN 1-4577-0868-X.
Written Opinion of the International Preliminary Examining Authority, Application No. PCT/FI2016/050570, dated Oct. 6, 2016, 11 pages.
International Preliminary Report on Patentability, Application No. PCT/FI2016/050570, dated Dec. 27, 2017, 22 pages.

* cited by examiner

CONTROLLING OF LIFTING DEVICE

TECHNICAL FIELD

The aspects of the disclosed embodiments generally relate to controlling a lifting device. The present disclosure relates particularly, though not exclusively, to controlling an industrial crane from the floor level with a control device.

BACKGROUND ART

An industry crane typically moves along rails mounted close to the ceiling in the longitudinal direction. A trolley moving laterally along the main girder enables a lateral movement. The lifting device has a loading member for grabbing a load e.g. via a hook, a rope, a wire, or a lifting sling. The loading member may also comprise a lifting boom, to which a hook, grab, chain sling, round sling or a rope can be attached. The loading member can be lifted and lowered. Hence, the loading member can be controlled in the directions of a right-angled coordinate system XYZ within the operational range of the crane.

Industrial cranes are commonly controlled from the floor level. A user of the crane, i.e. the operator, positions himself so that he can readily see the load and its surroundings. Especially through radio control, the operator of the crane can position himself in a safe place with a good line-of-sight of the steering direction, the loading member, the load, and the surroundings.

Using the crane efficiently requires getting used to the operation of the control device of the crane and more generally to the operation of the crane. On using the crane, consideration should be given to the free space required by the load, the obstacles in the surroundings, people, the acceleration of the crane and the effect of the inertia of mass on the loading member, on the load and on the crane, and the mechanisms causing oscillation. Oscillation can occur in relation to the X and Y directions. In some locations the operational range of the crane may be restricted in order to avoid damage, in which case a restricted area or areas, into which the crane cannot be steered, are defined in the crane.

The present disclosure aims to improve the ease and/or the efficiency of operating a crane, to improve the safety, or at least to offer a new technical alternative.

SUMMARY

According to a first aspect of the disclosed embodiments there is provided a method for controlling a lifting device, the method comprising:

detecting with smart glasses used by an operator a target intended by the operator;

detecting a driving command given by the operator; and responsively to the detection of the driving command, steering a loading member of the lifting device, or a load, towards said target.

The smart glasses may be means for augmented reality.

The steering of the loading member of the lifting device or a load, towards said target, may be continued until a determined time period has elapsed from the last time a driving command given by the operator was detected. The determined time period can at the maximum be: 10 milliseconds (ms), 20 ms, 50 ms, 200 ms, 500 ms or 1 s.

Data relating to the use of the lifting device may be presented with smart glasses to the operator during the use of the lifting device.

Said target intended by the operator may be selected using preset positioning signs in the operational range of the lifting device, wherein the positioning signs are imaged with a camera included in the smart glasses and identified automatically. The positioning points corresponding to the positioning signs, or the locations of the positioning points may be stored in a memory, e.g. in the memory of the lifting device.

The target intended by the operator may be detected from sensor data measured from the surroundings. The target intended by the operator may be detected based on a 3D point cloud formed from the images taken by the camera included in the smart glasses.

Automatic detection and selection of a target may be performed on any of the following targets: a detectably shaped load, a shelf or warehouse location, a machine tool, a vehicle, a loading area, a loading platform, general objects (e.g. a geometrical shape, such as an angle, a center, a mesh point), or a virtual target, such as a target of the augmented reality shown by the smart glasses. Also human figures or geometric shapes may be detected automatically for selecting a target or defining a safety area.

Product information and balance, which are received from a system of customer, may be shown to the operator from the shelf locations during the use of the lifting device.

The operator may be provided with a task list through the smart glasses e.g. for collecting products in a warehouse.

The operator may be provided with assistive data. The assistive data may comprise one or several of the following: route directions as a map; the distance and the direction to the target; route to the target drawn into a space; and highlighting of the target location. The target location may be highlighted with frames around the target. The frames may be highlighted with glow.

Steering of the lifting device may be continued without requiring the operator's gaze to be continuously directed towards the target.

If the operator directs the smart glasses towards a positioning point corresponding to the desired target, the locking of this positioning point may be implemented with a determined delay. The delay may be indicated by the smart glasses clearly distinguishably e.g. with a changing pattern or a countdown timer. The positioning point being locked may be indicated to the operator. The operator may be allowed to reject the target location being locked. The positioning point being locked may be rejected by directing the smart glasses elsewhere. Driving to the locked positioning point may be performed with a driving command control, such as a button. After stopping the use of the driving command control the operator may via the smart glasses lock the steering to a new positioning point and continue driving the lifting device towards the new locked positioning point.

In addition to, or instead of, using a delay, the positioning point may be locked with gesture control, voice control, or with a command from the control device.

When one task has been performed with the lifting device, the operator may be provided with an opportunity to take an image of the transferred load with the camera function of the smart glasses in order to assure quality. The image may be saved. The image may be stored in a customer system. The image may be stored in another system, such as the lifting device system.

The space surrounding the lifting device may be provided with a dense mesh, wherein the target intended by the operator may be freely selected from the set of positioning points in the mesh and the lifting device commanded to drive from one positioning point to another.

The smart glasses may be equipped with a viewfinder, directing which towards a space surrounding the lifting device creates a new positioning point to which the lifting device may be driven.

The system may be arranged to have the ability to learn. The system may be arranged to suggest the next position based on previous historical data, when a certain load is lifted from a certain position. The system may be arranged to show with the smart glasses the suggested route/position.

According to a second aspect of the disclosed embodiments there is provided a control device for a lifting device comprising:

a processor;

a memory; and program code, stored in the memory, to control the operation of the control device when executed by the processor, to cause:

detecting with smart glasses used by an operator a target intended by the operator;

detecting a driving command given by the operator; and responsively to the detection of the driving command steering a loading member of the lifting device, or a load, towards said target.

According to a third aspect of the disclosed embodiments there is provided a control unit of a lifting device comprising:

a processor;

a memory;

a control device channel for data transfer with a control device of the lifting device; and program code stored in the memory to cause, when executed by the processor:

maintaining data of the position and speed of the loading member of the lifting device;

receiving from the control device channel an indication of the target selected by the operator; and sending steering commands to the control device channel to steer the loading device to said target selected by the operator.

The program code may additionally be defined to cause the reception of data of the load being transferred, and to account for the size and/or weight of the load when steering the loading device to the target selected by the operator.

According to a fourth aspect of the disclosed embodiments there is provided a control device system comprising said control device and said smart glasses adapted to be capable of data transfer with each other.

According to a fifth aspect of the disclosed embodiments there is provided a lifting device, and arranged to control it a control device according to the second aspect of the disclosed embodiments or a control device system according to the third aspect of the disclosed embodiments.

The lifting device may be an electric overhead travelling crane.

According to a sixth aspect of the disclosed embodiments there is provided a system comprising a lifting device and a control device system according to any of the preceding aspects of the disclosed embodiments.

According to a seventh aspect of the disclosed embodiments there is provided a computer program comprising program code defined to cause the execution of any method according to the first aspect of the disclosed embodiments by the control device of the lifting device.

According to an eighth aspect of the disclosed embodiments there is provided a memory medium comprising the program code of the second, third or seventh aspect of the disclosed embodiments.

The different embodiments of the present disclosure are described or have been described only in one or in some of the aspects of the disclosed embodiments. A person skilled in the art understands that any embodiment of any aspect of the present disclosure may be applied in any embodiment of the same or a different aspect of the present disclosure, alone or together with other embodiments of the present disclosure.

BRIEF DESCRIPTION OF THE DRAWINGS

The present disclosure is now described illustratively with reference to the accompanying drawings, in which:

FIG. 1b shows a second view of the system of FIG. 1a;

DETAILED DESCRIPTION

In the following description, like reference signs denote like elements or steps. It should be noted that the figures presented are not to scale in their entirety, and that they mainly serve only an illustrative purpose.

Figure 1A:
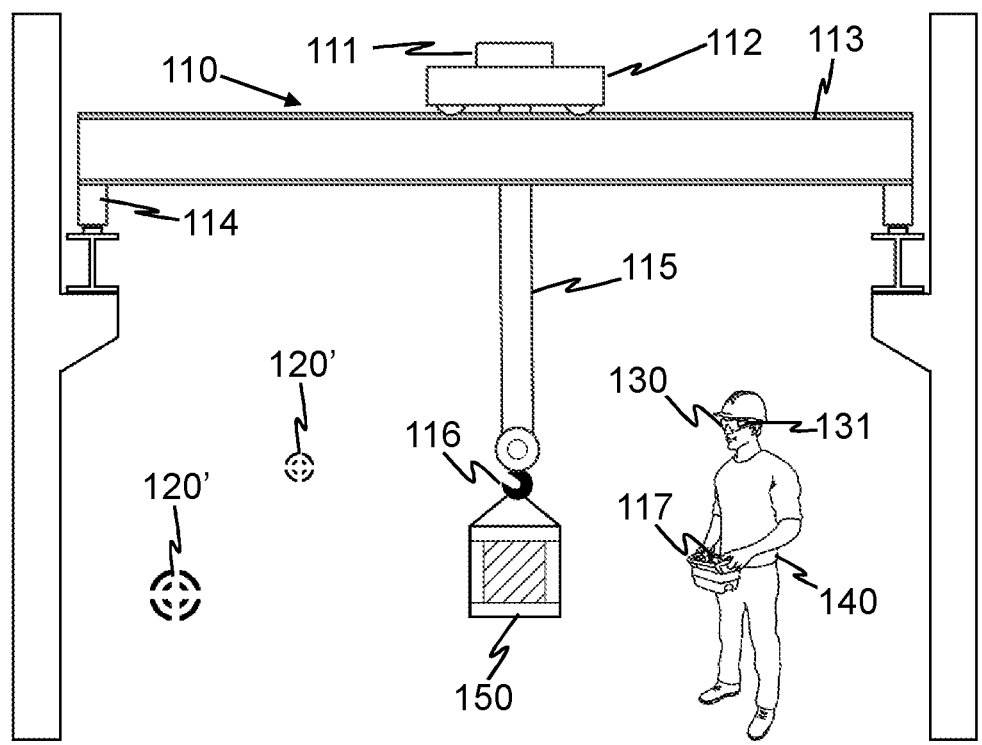
FIG. 1a shows a system according to an embodiment of the present disclosure.
Figure 1B:
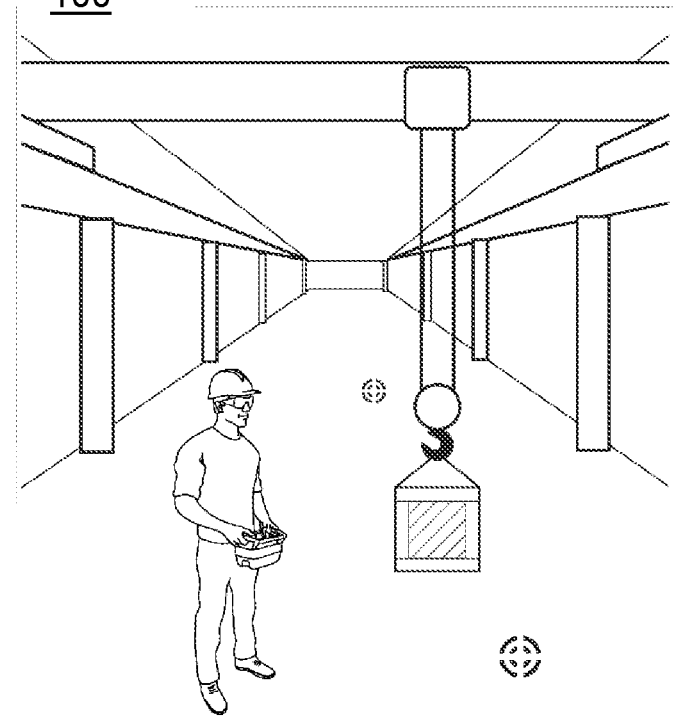

FIGS. 1a and 1b show a system 100 according to an embodiment of the present disclosure. FIG. 1a shows a lifting device 110 belonging to the system 100, positioning signs 120 corresponding to the positioning points, smart glasses 130, and a user 140, i.e. an operator, and a load 150. The lifting device 110 is e.g. an industrial crane, such as a bridge crane containing one or two girders. Optionally, the crane is a jib; a gantry crane; or a semi-gantry crane.

The lifting device 110 comprises a hoist 111 which is laterally movable with a trolley 112 along the main girder 113. The main girder 113 rests from its ends on rails 114 along which the lifting device 110 is movable in the longitudinal direction. A loading device 116, such as the hook drawn in FIG. 1a or another loading device, such as a grab or a sling, is attached to the lifting device 110 via a rope 115. The lifting device further comprises a control device 117, which in FIG. 1 is a wireless control device. The smart glasses 130 contain a camera 131. The use of the lifting device 110 can be facilitated and made more efficient with the smart glasses by facilitating the presentation of data to the operator 140 and the reception of the steering commands of the lifting device from the operator. To serve this purpose, there is, between the smart glasses 130 and the control device 117, or the smart glasses and any other part controlling the lifting device (not shown in the figure), a communication link, such as a connection created using wire (e.g. a USB connection), with the control device or a wireless connection, such as Bluetooth or WLAN, with another part controlling the lifting device 110. Said another controlling part may e.g. be a controller, i.e. a control unit, of a lifting device which may also handle the anti-sway functionality.

The control device may be a functionally separate automation element or connected to a larger automation system. Physically, the control unit may be positioned in conjunction with the lifting device, e.g. as a part moving together with the lifting device or a fixedly installed part e.g. in the automation room.

The smart glasses 130 may be means of augmented reality containing a screen and possibly also a camera 131. The smart glasses may e.g. be Sony SmartEyeglass™ Epson Moverio BT-200™; Google Glass™, Vizix M100 Smart Glasses™, or GlassUp™. With the camera 131 data of each lifting event may be saved, and the data of the lift integrated to the stock management and quality management systems. Data recorded in the images may also be used in data collection for maintenance, e.g. in the extent in which parts and views of the lifting device itself are recorded. The data collection for maintenance may be joined to a fixed automation channel 420 with a wire or wirelessly.

Figure 2:
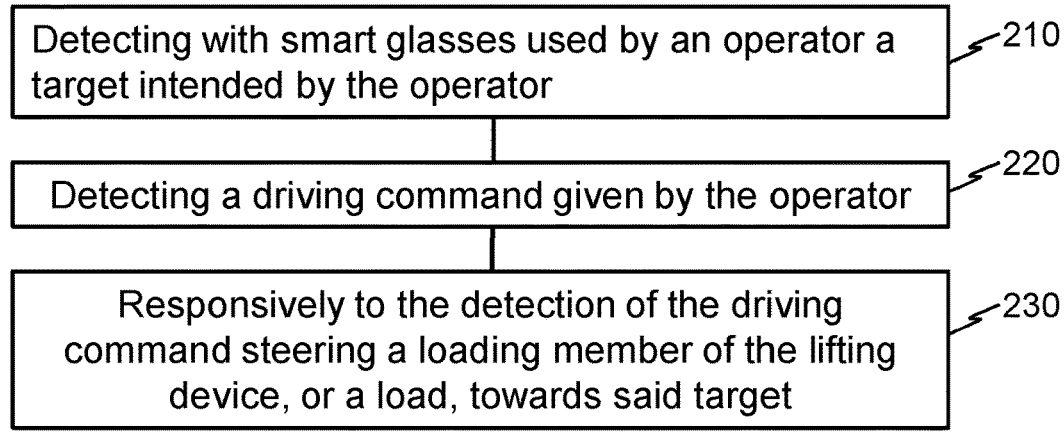
FIG. 2 shows a schematic figure of a method according to an embodiment of the present disclosure.

FIG. 2 shows a schematic figure of a method according to an embodiment of the present disclosure, the method comprising:

detecting 210 with smart glasses used by an operator a target intended by the operator;

detecting 220 a driving command given by the operator 140; and responsively to the detection of the driving command steering 230 a loading member of the lifting device, or a load, towards said target.

The steering of the loading member of the lifting device or a load, towards said target, may be continued until a determined time period has elapsed from the last time a driving command given by the operator was detected. The determined time period can at the maximum be: 10 milliseconds (ms), 20 ms, 50 ms, 200 ms, 500 ms or 1 s.

Based on the route of the load, swaying may be automatically controlled by taking into account the impulses causing swaying that originate from the route.

Data relating to the use of the lifting device may be presented with smart glasses to the operator during the use of the lifting device. The data relating to the use of a lifting device may comprise one or several of the following:

planned route of the lifting device or the load;
weight of the load;
functionalities of the lifting device being used, such as selection of the hoist, swaying control, slow speed;
error situations and alerts, such as a notification of a diagonal pull or an emergency stop when the lifting device is moving, to decrease ways of operation wearing the lifting device;
showing, with the smart glasses to the operator, properties of the lifting device invisible to the naked eye, such as:
restricted areas, e.g. passageways, a shelf, a machine tool, an area designated for breaks, there may be different levels of restricted areas: not allowed to drive over the restricted area/stops but the border may be overridden/just a notification of being in a special area
working borders set by the operator himself
positioning points
a safety area of the loading member or the load (e.g. 1 m in each direction from the detected shapes of the load, when the load is moving the safety area is grown in the direction of the motion), a dynamically adjusting safety area according to the weight and speed of the load;
safety of an operator equipped with smart glasses may be secured by creating a safety area around the operator;
other persons moving in the area may be detected with the smart glasses and a safety area or safety areas may be created around them;
in automatic positioning, indicating the route being driven e.g. with a dotted line
status information of the lifting device, such as condition monitoring and maintenance data about a part of the lifting device towards which the gaze of the operator is directed, e.g. a hook block or a control device, the part may contain an identification detected by the smart glasses or the smart glasses detect the shape of the part.

Said target intended by the operator may be selected using preset positioning signs corresponding to the positioning points which are imaged with the camera included in the smart glasses and detected automatically. The positioning signs may include a QR (quick response) code. At a detected positioning sign data relating to the particular positioning point may be shown, such as the name of the positioning point, the name of the shelf location, or data of the material located in the positioning point. The positioning sign may comprise a pattern formed on a pre-existing surface. The positioning sign may comprise a movable piece into which a pattern automatically detected by the camera of the smart glasses has been formed. The pattern may be printed. The printed pattern may be coated. The positioning sign may comprise a transparent sheet to protect the pattern. The positioning sign may be created e.g. by printing a QR code on a sticker and pasting to the wall or shelf or other structure of the storage location. The positioning point may be attached to a fixed or moving target, such as a piece being moved in an automated warehouse. The operation of the system is facilitated if movements of the moving target are implemented automatically. The positioning point may also be indicated to the operator with the smart glasses without a visible positioning sign, e.g. with a infra-red sign or signs or with 3D tracking or with coordinate data.

Product information and balance, which are received from a system of customer, may be shown from the shelf locations. The operator may be provided with a task list through the smart glasses e.g. for collecting products in a warehouse.

The operator may be provided with assistive data, such as route directions as a map, a distance and a direction, a route drawn into a space, highlighting of the target location (e.g. frames highlighted with glow around the target).

The steering of the lifting device may be continued without requiring the operator's gaze to be continuously directed towards the target. This way the operator may perform controlling of the lifting device by giving, continuously or repeatedly with a sufficient frequency, a driving command e.g. by pushing continuously or with a sufficient frequency a button, and the operator may safely with his gaze follow the movement of the lifting device or load. In an embodiment of the present disclosure, a simple repeat run is done e.g. by saving 2, 3, or 4 positioning points and simply driving the lifting device from one point to another with one accepting command, if the work order comprises repetitive driving between two or more positioning points. At each point, attaching and/or detaching of the load may be performed e.g. manually. The desired positioning points may for this purpose first be selected with the smart glasses. The work cycle of the repeat run may be exited with a separate stop command of the repeat run. A button may be provided to start and/or stop the repeat run. In one embodiment of the invention, the starting of a repeat run may be indicated e.g. by selecting the same target twice in a row during a determined time period.

If the operator directs the smart glasses to a positioning point corresponding to the target intended by the operator, the locking of the particular positioning point may be implemented with a determined delay (or in another way, such as with gesture or voice control or with a command from the control device). The delay may be indicated by the smart glasses clearly distinguishably e.g. by using a moving or visually changing indicator showing the elapsing of the delay. The driving command control of the control device 117, such as a button, may be employed to drive to the locked positioning point. After stopping the use of the driving command control, the operator may lock through the smart glasses the steering to a new positioning point and continue to drive the lifting device towards the new locked positioning point.

When a task given by the system has been performed, the operator may be provided with an opportunity to take an image of the transferred load with the camera function of the smart glasses in order to assure quality. The image can be stored e.g. in a customer system.

A dense mesh may be provided in a space, wherein the operator can freely select the positioning point corresponding to the target intended by the operator from the set of positioning points of the mesh, and to command the lifting device to drive from one positioning point to another, by making the mesh denser a precise positioning is achieved.

The smart glasses can be equipped with a viewfinder, directing which towards a space creates a new positioning point to which the lifting device can be driven. The aim of the view finder can be shown to the operator and to other persons e.g. with a laser sight attached to the smart glasses which forms a visible sign on the positioning point, such as a point or cross.

Signposts assisting the operator, such as (starting of the lifting device), manuals (beginners guide), orientation functionalities (training mode in which the lifting device is only ran virtually for learning purposes), can be presented with the glasses.

Figure 3:
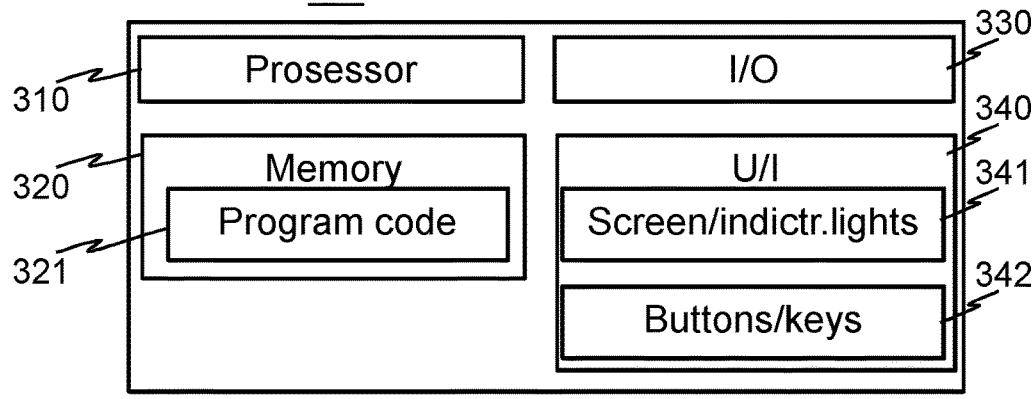
FIG. 3 shows a block diagram of a control device of a lifting device according to an embodiment of the present disclosure.

FIG. 3 shows a block diagram of the control device 117 for controlling a lifting device according to an embodiment of the present disclosure. The control device 117 comprises:

a processor 310;

a memory 320; and program code 321, stored in the memory, to control the operation of the control device when executed by the processor 310, to cause:

detecting 210 with the smart glasses 130 used by the operator 140 a target intended by the operator;

detecting 220 a driving command given by the operator 140; and responsively to the detection of the driving command steering 230 the loading member 116 of the lifting device or the load 150 towards said target.

The control device comprises further a data transfer unit I/O 330 to transfer data with the control device 117 and the lifting device 110 or with the loading member 116 of the lifting device, and to transfer data between the control device 117 and the smart glasses 130, a user interface 340 comprising presentation means 341, such as e.g. a screen and/or indicator lights, and input means 342, such as e.g. one or several buttons, touch detection on the screen or on other parts, or keys or a keyboard.

The program code can be installed to the control device 117 from the memory device. The memory device may e.g. be a USB stick or a CD-ROM or a DVD disk. Optionally, the program code can be downloaded from an information network, such as the Internet.

Figure 4:
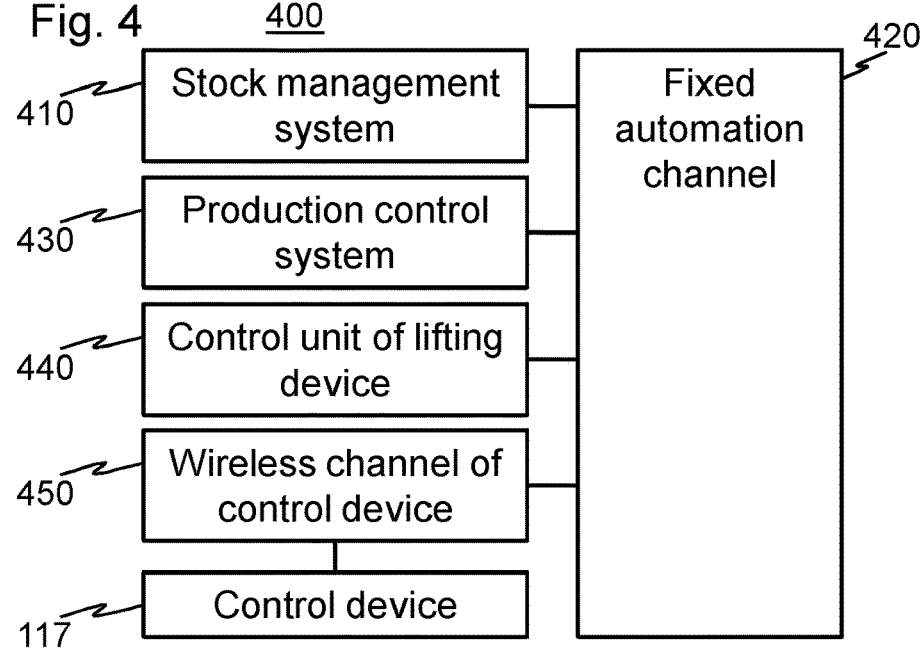
FIG. 4 shows a block diagram of an automation system according to another embodiment of the present disclosure, the system being adapted to support operations according to one or several embodiments of the present disclosure.

FIG. 4 shows a block diagram of an automation system 400 according to an embodiment of the present disclosure, the automation system being adapted to support operations according to one or several embodiments of the invention. The automation system 400 comprises one or several of the following: a stock management system 410; a fixed automation channel 420 which the stock management system has an data transfer connection with; a production control system 430 in connection with the fixed automation channel 420; a control unit 440 of the lifting device in connection with the fixed automation channel 420; a wireless channel 450 of the control device (e.g. a local area network bridge) in connection to the fixed automation channel 420; and a control device 117 in connection with the wireless channel 450 of the control device (if a control device with a wire is used, a wireless channel of the control device is not necessarily needed and the control device 117 can directly or via a different interface connect to the fixed automation channel 420).

The foregoing description provides non-limiting examples of some embodiments of the present disclosure. It is however clear to a person skilled in the art that the present disclosure is not limited by the details of the embodiments presented in the foregoing, but that the present disclosure can be implemented in other equivalent ways. E.g. the control device can be integrated with the smart glasses, or some parts described as one part can be implemented using several parts (such as several processors or memories instead of one), or parts described separately can be implemented as parts with several functions.

Some of the features of the afore-disclosed embodiments of this present disclosure may be used to advantage without the corresponding use of other features. As such, the foregoing description shall be considered as merely illustrative of the principles of the present disclosure, and not in limitation thereof. The scope of the present disclosure is only restricted by the appended patent claims.

The invention claimed is:

1. A method for controlling a lifting device that is an industrial crane, comprising:

detecting with smart glasses used by an operator a target intended by the operator;

detecting a driving command given by the operator; and responsively to the detection of the driving command, steering a loading member of the lifting device or a load towards said target;

presenting with the smart glasses to the operator during the use of the lifting device data relating to the use of the lifting device; and selecting the target intended by the operator by, in the operational range of the lifting device, using preset positioning signs that are imaged with a camera included in the smart glasses and detected automatically.

2. The method according to claim 1, further comprising continuing to steer a loading member of the lifting device, or the load, towards said target until a determined time period has elapsed from the last time the driving command given by the operator was detected.

3. The method according to claim 1, further comprising continuing automatically the steering of the lifting device without requiring gaze of the operator to be continuously directed towards the target.

4. The method according to claim 1, wherein, if the operator directs the smart glasses to a positioning point corresponding to the target intended by the operator, this positioning point is locked with a determined delay.

5. The method according to claim 4, further comprising clearly distinguishably expressing the delay with the smart glasses.

6. The method according to claim 4, further comprising driving the lifting device to the locked positioning point with the driving command control of the control device.

7. The method according to claim 4, further comprising allowing, after stopping the use of the driving command control, the operator to lock, through the smart glasses, the steering to a new positioning point and to continue driving the lifting device towards the new locked target intended by the operator.

8. The method according to claim 1, wherein a dense mesh is provided in the space surrounding the lifting device, and further comprising allowing the operator to freely select the target intended by the operator from the set of positioning points of the mesh, and to command the lifting device to drive from one positioning point to another.

9. The method according to claim 1, wherein the smart glasses are equipped with a viewfinder, directing which towards a space allows the operator to create a new positioning point to which the lifting device can be driven.

10. A control device for controlling a lifting device that is an industrial crane, comprising:
   a processor;
   a memory; and
   program code, stored in the memory, to control the operation of the control device when executed by the processor, to cause:
   receiving from smart glasses used by an operator the detection of a target intended by the operator;
   detecting a driving command given by the operator;
   responsively to the detection of the driving command steering a loading member of the lifting device, or a load, towards said target;
   presenting with the smart glasses to the operator during the use of the lifting device data relating to the use of the lifting device; and
   automatically selecting the target intended by the operator by, in the operational range of the lifting device, using preset positioning signs that are imaged with a camera included in the smart glasses and detected automatically.

11. A control device system, wherein the control device system comprises the control device of claim 10 and said smart glasses adapted to be capable of data transfer with each other.

12. The control device system according to claim 11, wherein the control device system is arranged to implement the method according to claim 2.

13. A lifting system comprising the control device system according to claim 11, and a lifting device that is an industrial crane controllable with the control device system.

14. The lifting system according to claim 13, wherein the lifting device is an electric overhead travelling crane.

* * * * *